United States Patent [19]

Lewis, Jr.

[11] Patent Number: 4,813,199

[45] Date of Patent: Mar. 21, 1989

[54] BREAKAWAY UTILITY POLE SHEAR BASE STRUCTURE

[75] Inventor: John R. Lewis, Jr., Chapin, S.C.

[73] Assignee: Shakespeare Company, Newberry, S.C.

[21] Appl. No.: 188,351

[22] Filed: Apr. 29, 1988

[51] Int. Cl.$^4$ ............................................. E02D 27/42
[52] U.S. Cl. ......................................... 52/98; 52/297; 403/2
[58] Field of Search ................... 52/297, 298, 98, 296; 404/9, 10; 403/2

[56] References Cited

U.S. PATENT DOCUMENTS

| | | | |
|---|---|---|---|
| 3,499,630 | 3/1970 | Dashio | 52/98 X |
| 3,630,474 | 12/1971 | Minor | 404/9 X |
| 3,820,906 | 6/1974 | Katt | 404/10 X |
| 4,070,837 | 1/1978 | Sato | 52/297 |

Primary Examiner—David A. Scherbel
Assistant Examiner—Anthony Williams
Attorney, Agent, or Firm—Renner, Kenner, Greive, Bobak, Taylor & Weber

[57] ABSTRACT

A breakaway utility pole structure having a tubular base (11) anchored in the ground substantially at ground level and adapted to telescopically secure the bottom end portion of a pole (9), the base (11) having a circumferential shear groove (20) adjacent to its bottom end, and the base being secured in the base by adhesive material (12) and by bolts (21) spaced above the shear groove (20), the shear groove is adapted to cause failure of the base when the pole is subjected to horizontal impact at a predetermined distance above ground level from a vehicle of predetermined weight moving horizontally at a predetermined minimum speed.

14 Claims, 2 Drawing Sheets

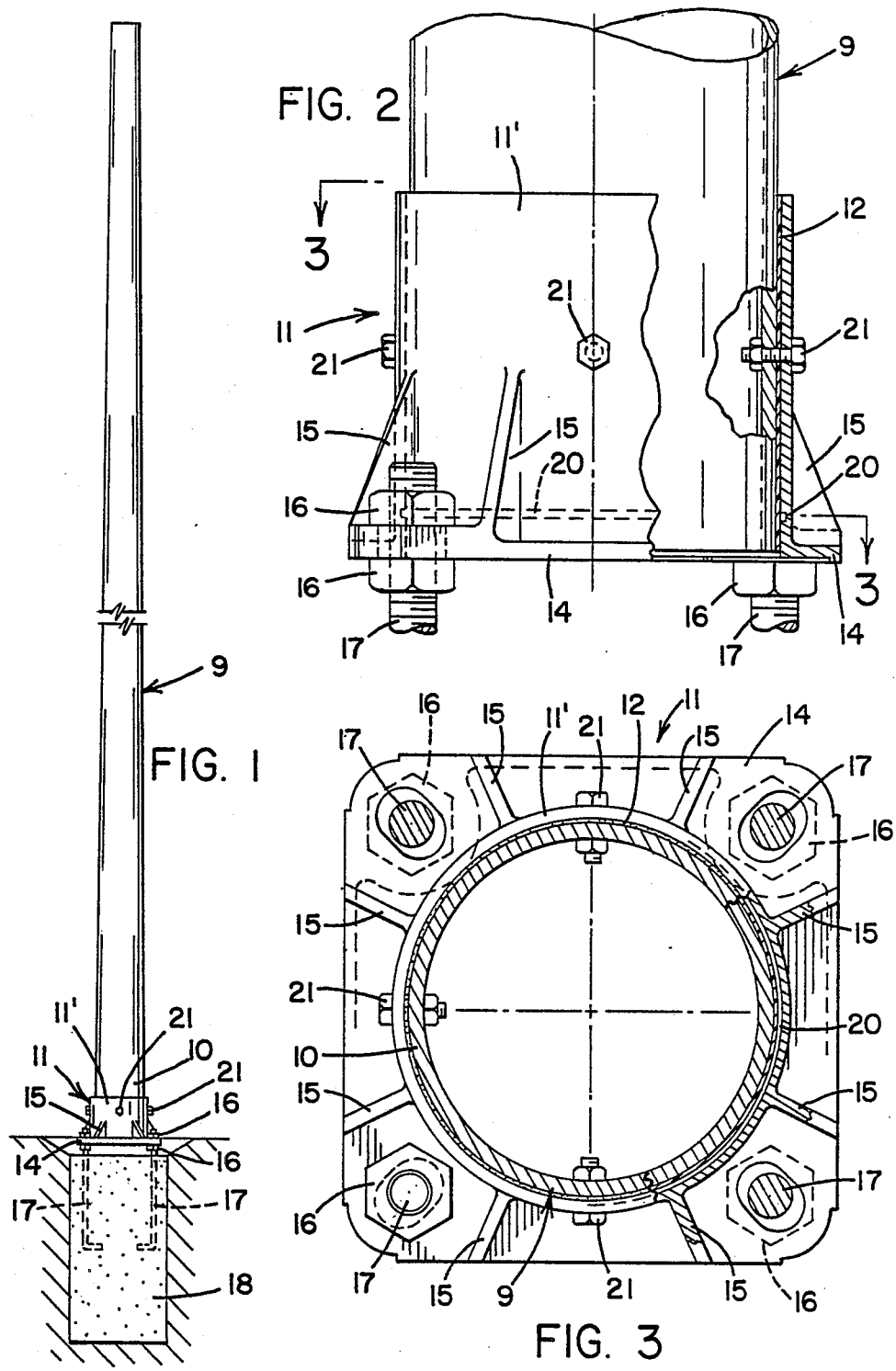

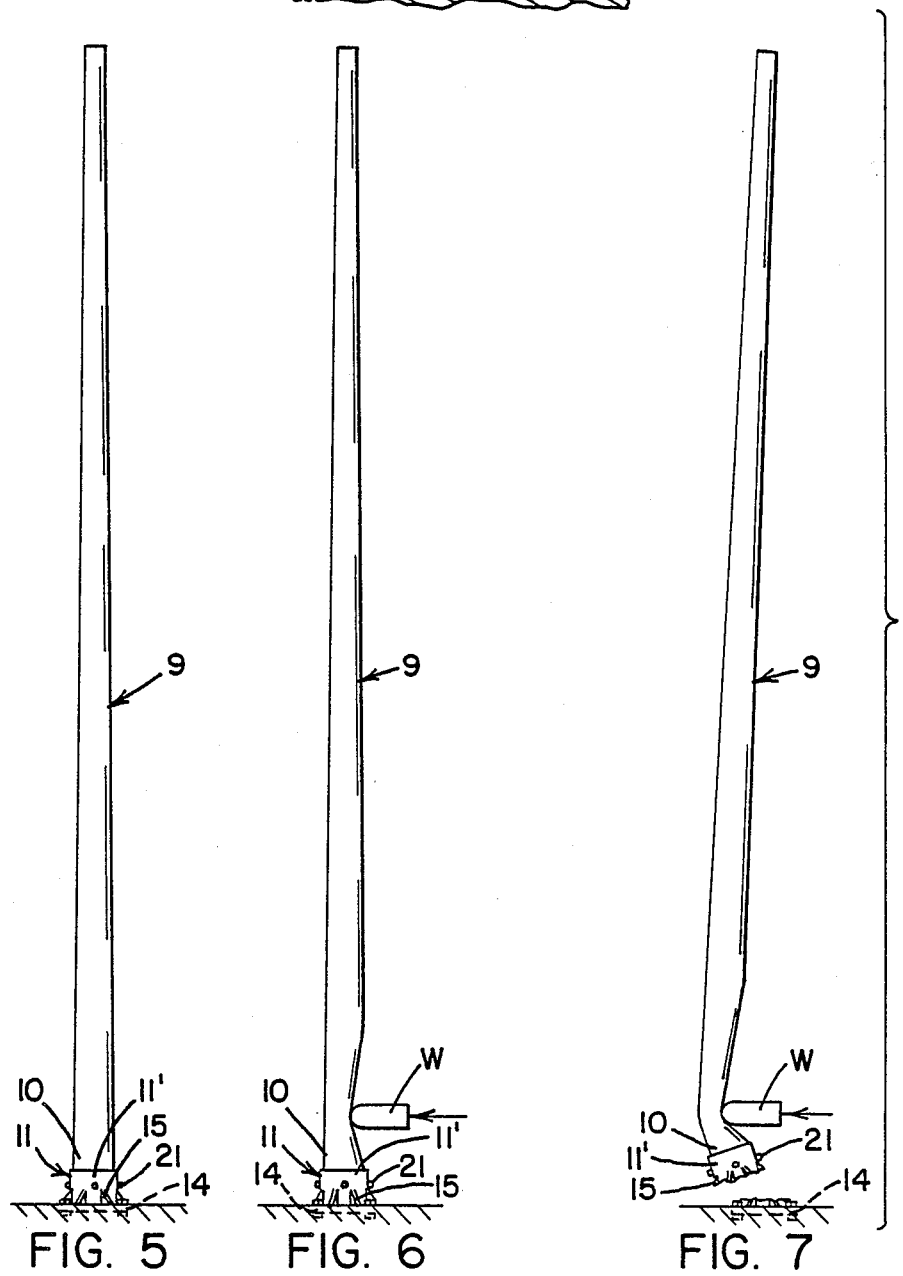

BREAKAWAY UTILITY POLE SHEAR BASE STRUCTURE

TECHNICAL FIELD

The invention relates generally to highway utility poles, and more particularly to poles for supporting lights, signs, traffic signals and the like, alongside roads and highways.

BACKGROUND OF THE INVENTION

Highway pole structures utilized on federally funded highways projects must meet the breakaway performance criteria when struck by errant vehicles in order to diminish as much as possible serious injury to the occupants of such vehicles resulting from striking such pole structures. Originally, highway poles were wood, steel or concrete, and such poles provided such rigid resistance to impact from vehicles before breaking away that the injury to the occupants was extremely severe or even fatal. Moreover, when such poles did break, not only were the occupants subjected to probable further injury after impact by the broken off pole crushing the top of the vehicle, but a jagged stub was often left extending above ground a substantial distance, presenting an additional hazard in the likelihood of damaging the steering or underside of the vehicle, or of crushing the vehicle and occupants from the front after impact.

The present required breakaway performance criteria are set forth in the American Association of State Highway Transportation Officials Publication entitled "Standard Specifications for Structural Supports for Highway Signs, Luminaries and Traffic Signals 1985", which states that when a standard 1800 pound vehicle (or its equivalent) travelling at 20 MPH (29.3 feet per second) strikes the luminary support at 18 inches above ground level (as specified in National Cooperative Highway Research Program (NCHRP) Report 230, page 41), the speed of the vehicle is not to be reduced after break away more than 15 feet per second, and preferably not more than 10 feet per second. Another requirement is that any remaining structure after breakaway shall not extend more than four inches above the ground level. Previously these requirements were based upon 2250 pound vehicles.

Prior pole structures for meeting the criteria with the heavier vehicles, such as grooved breakaway bolts and anchorbase fittings of frangible material, have not been satisfactory when tested with lighter vehicles weighing a minimum of 1800 pounds.

In attempting to meet these requirements, highway utility poles have been constructed of lightweight materials such as aluminum and fiberglass, but difficulties have been encountered in providing poles strong enough to resist wind and weight loads while meeting the breakaway requirements, and in avoiding leaving jagged stubs extending more than 4 inches above ground after breakaway.

SUMMARY OF THE INVENTION

The present invention utilizes a pedestal base mounted on a base plate anchored in the ground and adapted to telescopically receive the bottom end portion of a utility pole adhesively bonded to the base. The base is weakened adjacent to its bottom end by a circumferential groove to cause failure and release of the pole and base upon lateral impact of the pole and base by a moving vehicle.

It is an object of the present invention to provide such a pole structure which will break away when struck by a vehicle of required minimum weight moving at a predetermined minimum speed.

Another object is to provide such a pole structure which will cause not more than a predetermined minimum reduction in vehicle speed after impact.

A further object is to provide such a pole structure which will not leave any mounting structure projecting more than four inches above ground after impact.

A still further object is to provide an attractive lightweight breakaway pole structure which will accomplish the foregoing objectives and provide adequate resistance to wind and weight loads.

These and other objects are accomplished by the improved pole structure comprising the present invention, the preferred embodiment of which is shown by way of example as illustrating the best known mode of carrying out the invention. Various modifications and changes in details of construction are contemplated within the scope of the appended claims.

BRIEF DESCRIPTION OF THE DRAWINGS

FIG. 1 is a side elevational view of a preferred embodiment of the invention, showing the bottom end portion of a utility pole received in the tubular portion of a breakaway pedestal base anchored to a foundation in the ground.

FIG. 2 is an enlarged fragmentary elevation, partly in section, of the bottom end of the pole mounted in the base, the base having an internal circumferential shear groove adjacent to the bottom end of the pole.

FIG. 3 is an enlarged plan section on line 2—2 of FIG. 2.

FIG. 4 is an enlarged detached fragmentary vertical sectional view of the base, showing the shear groove and its preferred dimensions relative to the wall of the base.

FIGS. 5, 6 and 7 are schematic vertical cross-sectional views showing the changing positions of the pole and base when breaking away due to horizontal impact by a moving force.

DESCRIPTION OF A PREFERRED EMBODIMENT

The tubular pole 9 shown in FIGS. 1-7 may be straight or tapered longitudinally. It may be made of any of several materials such as steel or aluminum or other materials such as reinforced fiberglass. It must be strong enough to resist top and wind loading, while subject to failure when tested as prescribed by the American Association of State Highway Transportation Officials publication entitled "Standard Specifications for Structural Supports for Highway Signs, Luminaries and Traffic Signals 1985." Accordingly, the more acceptable materials for breakaway poles are relatively lightweight materials such as aluminum or reinforced plastics such as fiberglass.

As shown in FIG. 1 the lower end portion 10 of pole 9 is telescopically received in the upper tubular portion of the base 11 which is preferably aluminum although it may be of another material. The tubular portion 11' is adapted to fit closely over the bottom end portion of pole 9, with sufficient clearance to allow for a layer 12 of bonding adhesive which may be an epoxy such as Versamaid ® formulated to fail and release the pole when it is subjected to impact under the conditions previously described herein. The thickness of the adhesive material may be from about 1/16 inch to 3/16 inch. Versamaid ® is a registered trademark of General Mills Chemicals, Inc.

The bottom flange 14 of base 11 is connected to the tubular portion 11' by a series of vertically disposed tapered reinforcing flanges 15. The bottom flange is generally square in plan, with bolt apertures in its corners. The bottom flange 14 is mounted by nuts 16 on anchor bolts 17 set in a buried concrete foundation 18. As shown, the bottom flange 14 may be recessed below ground level.

A tapered tubular pole 9 of reinforced fiberglass was mounted with its lower end telescopically bonded within the tubular portion 11' of the base 11. The outer diameter of the pole at ground line was about 8 inches and its thickness ¼ inch. The pole extended about 23 feet above ground and had an outer diameter of $4\frac{7}{8}$ inches at the top with a wall thickness of $\frac{3}{8}$ inch. An 8 foot luminaire arm was attached to the pole 9 inches from the top with a 50 pound weight on the outer end of the arm to simulate the mass of a luminaire.

The base 11 was cast aluminum alloy having the following properties: ultimate tensile strength 36,000 psi, minimum yield strength 28000 psi, and elongation in 2" 3.5%. The radial thickness of the tubular portin 11' was 3/16 inch. A circumferential shear groove 20 was cut in the inner surface 1 inch above the bottom surface of the flange 14 before mounting the pole therein. The groove was 0.100 inch deep by 0.060 inch wide. After bonding the pole in the base, the pole was additionally secured to the tubular portion 11' by four $\frac{3}{8}$ inch bolts 21 located circumferentially equally spaced about midway between the flange 14 and the top of tubular portion 11'.

The pole was tested as required by an 1800 pound weight W moving horizontally at 20 miles per hour striking the pole 18 inches above ground level with the luminaire arm at 90+ to the line of travel of the weight W. The impact separated the casting by failure at the internal groove and progressively breaking crosswise through ribs 15, releasing the pole together with the upper part of the casting in the manner shown in FIGS. 5, 6 and 7. Only the bottom flange of the casting remained on the anchor bolts and it was well below the required 4 inches above ground level. The bolts 21 prevent delamination of the adhesive bond above the shear groove 20, and after failure at the groove, the lower portion of the pole below the groove collapses, delaminates and pops out of the remaining base portion.

The velocity of the weight W before impact was approximately 31.2 feet per second and the velocity after impact was 27.6 feet per second, making the change in velocity 3.6 feet per second, which is well within the requirements of the American Association of State Highway Transportation Officials, namely: a speed reduction of not more than 15 feet per second, and preferably not more than 10 feet per second.

The present invention provides an improved breakaway pole mounting structure meeting standard test requirements, which structure is light in weight and inexpensive to manufacture and install while adequate in load bearing properties.

I claim:

1. A breakaway utility pole mounting structure comprising:

a utility pole having at least one substantially tubular end portion;

a base anchor in the ground substantially at ground level having a tubular portion extending vertically above ground level and adapted telescopically to enclose said pose end portion;

said base tubular portion having a circumferential shear groove therein adjacent its bottom end; and bolt means spaced above said groove and passing through said base tubular portion and said pole end portion to secure said base tubular portion to said pole end portion;

said shear groove adapted to cause failure of the base when said pole is subjected to impact at a predetermined distance above the base from a vehicle of predetermined minimum weight moving horizontally at a predetermined minimum speed.

2. A breakaway mounting structure as in claim 1, wherein an adhesive material bonds said pole end portion to said base tubular portion, said adhesive material adapted to fail at the shear groove coincident with failure of said base.

3. A breakaway mounting structure as in claim 2, wherein said base is adapted to release said pole while secured to the upper portion of the base above the shear groove upon failure at the shear groove, leaving a base structure part no more than 4 inches above ground level.

4. A breakaway mounting structure as in claim 3, wherein said base is subjected to impact 18 inches above ground level.

5. A breakaway mounting structure as in claim 4, wherein said base is subjected to impact from a vehicle weighing 1800 pounds moving at about 29.3 feet per second.

6. A breakaway mounting structure as in claim 1, wherein said shear groove is spaced about 1 inch above the bottom of said base tubular portion.

7. A breakaway mounting structure as in claim 6, wherein an adhesive material bonds said pole end portion to said base tubular portion, said adhesive material adapted to fail at the shear groove coincident with failure of said base.

8. A breakaway mounting structure as in claim 7, wherein said base is adapted to release said pole while secured to the upper portion of the base above the shear groove upon failure at the shear groove, leaving a base structure part no more than 4 inches above ground level.

9. A breakaway mounting structure as in claim 8, wherein said base is subjected to impact 18 inches above ground level.

10. A breakaway mounting structure as in claim 6, wherein the radial thickness of said base tubular portion is about 3/16 inch and the shear groove is about 0.100 inch deep by about 0.060 inch wide.

11. A breakaway mounting structure as in claim 1, wherein the radial thickness of said base tubular portion is about 3/16 inch and the shear groove is about 0.100 inch deep by about 0.060 inch wide.

12. A breakaway mounting structure as in claim 11, wherein said base is adapted to release said pole while secured to the upper portion of the base above the shear groove upon failure at the shear groove, leaving a base structure part no more than 4 inches above ground level.

13. A breakaway mounting surface as in claim 12, wherein said base is subjected to impact 18 inches above ground level.

14. A breakaway mounting structure as in claim 13, wherein said base is subjected to impact from a vehicle weighing 1800 pounds moving at about 29.3 feet per second.

* * * * *